INVENTOR
MERWYN C. GILL
BY
ATTORNEYS 3,560,316
LAMINATED FIBER GLASS FLOORING AND
METHOD OF MAKING THE SAME
Merwyn C. Gill, Pasadena, Calif.
(4076 Easy St., El Monte, Calif. 91731)
Filed Sept. 25, 1967, Ser. No. 670,341
Int. Cl. B32b 1/04
U.S. Cl. 161—41
7 Claims

ABSTRACT OF THE DISCLOSURE

An integrally formed laminated fiber glass flooring material having a continuous top skin and I-beam stress elements; and a method of making such a structure by molding the resin impregnated glass cloth around a plurality of mandrels and then cutting away the bottom surface of each core element and removing the mandrel therefrom.

---

This invention relates generally to laminated fiber glass sheets and more specifically this invention relates to laminated fiber glass sheets having support elements in which the sheets are formed integrally with the support elements and entirely of a single substance. This invention also relates to a method of manufacturing such fiber glass sheets.

Quite a number of techniques have been proposed in the past for the formation of fiber glass sheets for use in flooring or as panels and particularly such sheets have been of interest for use in aircraft flooring. It is of particular importance in the aircraft field that flooring materials have a high strength-to-weight ratio as well as being fire resistant, have good load bearing abilities, impact resistance and service life. The most common type of structure to provide these qualities is a cellular core, sandwich type construction whereby the cellular cores eliminate considerable weight while providing sufficient strength. The manufacture of such structures requires a considerable number of steps and is therefore more costly than the process proposed by the present invention. In addition, such sandwich constructions are usually of several dissimilar materials and proper adhesion between them is always a problem. Many proposals have been made to have longitudinal cores formed by wrapping glass cloth about mandrels formed of wax or plastic foam or some other type of mandrels which are removed after the resin has set. In those instances where mandrels of foam are used, some weight is still unnecessarily added to the structure and under fire conditions, the foam frequently emits toxic fumes. In instances where the mandrels have been removed, the continued provision of upper and lower skins still adds unnecessary weight to the structure and makes it somewhat inflexible and difficult to handle.

The present invention avoids the above mentioned problems by providing an extremely simple method of manufacture in which the bottom side of the cores is removed and the mandrel can then be easily extracted from the cores leaving an upper surface supported by I-beams formed integrally therewith. Not only does the removal of the bottom skin provide the easiest means for removing the mandrel, but it optimizes the strength-to-weight ratio and makes handling and use much easier.

It is an object therefore of the present invention to provide an improved method of manufacturing laminated fiber glass flooring panels having I-beam support members.

It is a more specific object of the present invention to provide a simple method of manufacturing flooring panels having a minimum weight and high strength, resistance to corrosion, fire and impact.

Figure 1:
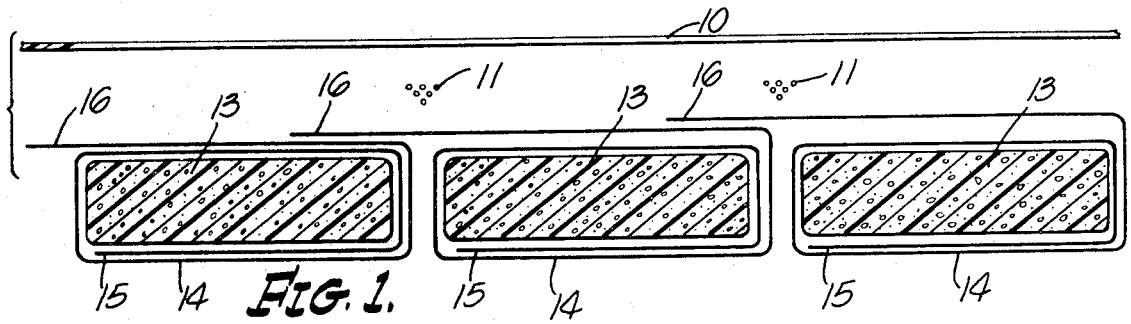
Figure 2:
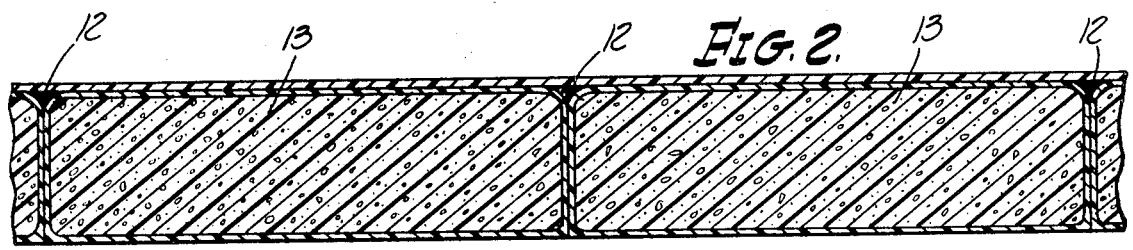
Figure 3:
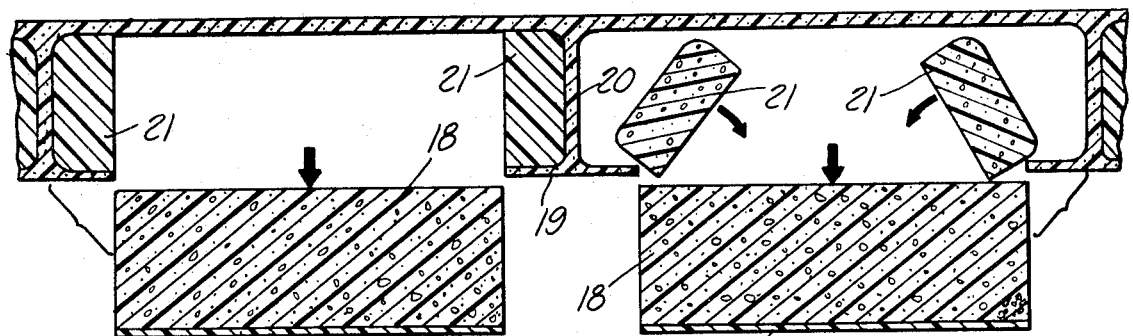
Figure 4:
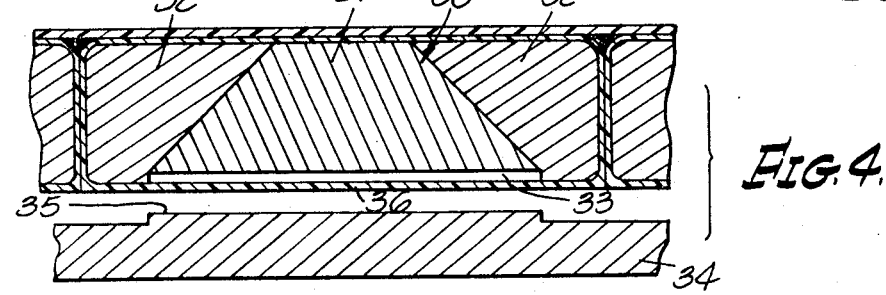
Figure 5:
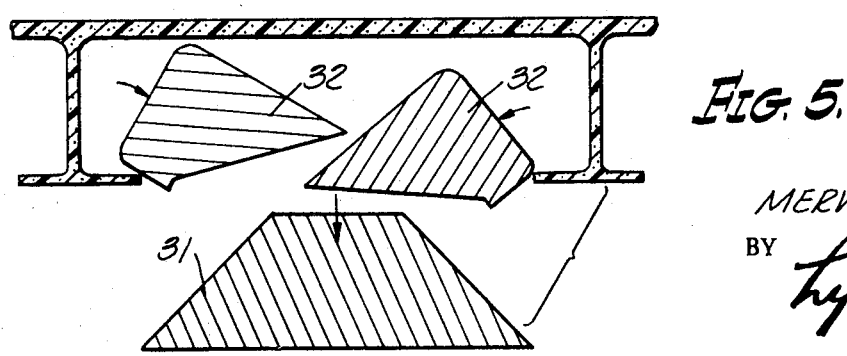

Further objects and advantages of the present invention will become apparent upon reading the following description in conjunction with the drawings, in which:

FIGS. 1, 2 and 3 demonstrate the steps in the formation of the flooring material. FIGS. 4 and 5 demonstrate the use of an alternative form of mandrel made in three pieces.

In FIG. 1, a top skin or sheet 10 is shown. This is a resin impregnated glass cloth. The type and number of plies in sheet 10 would be determined by the strength and weight desired for the final product. Bundles of glass roving 11 are provided to fill in the fillet areas 12 as shown in FIG. 2 and the roving 11 is a bundle of continuous longitudinal fibers so positioned as to be molded into the appropriate spaces where the fillets will be formed. The mandrels 13 are constructed of urethane foam, or other suitable material each having substantially the same cross-sectional dimensions and each of the mandrels 13 is wrapped with resin impregnated glass cloth 14, preferably in the manner shown in FIG. 1. Of course any thermosetting resin may be used including polyester, epoxy, silicone, etc. In the wrapping of the glass cloth 14 it is begun at end 15 extending along the bottom side of the mandrel 13 and wrapping counterclockwise at least one and one half turns with the opposite end 16 extending past the edge of the mandrel 13 in such manner as to overlap the adjacent mandrel. By wrapping in this manner, each of the cells is integrally interlocked with the adjacent cell and the fibers in the top skins and those portions of the cells forming the vertical portion of the I-beams will be oriented in the same directions.

After each of the cells is wrapped and assembled as demonstrated by FIG. 1, the structure is molded together as shown in FIG. 2 and allowed to cure whereby the various layers will flow together to form an integral structure. After the resin has cured, a section 17 of the lower skin is cut as shown in the left hand side of FIG. 3. The mandrel 13 is also cut removing a rectangular block 18 of the mandrel 13 together with section 17. The size of the section 17 cut from the lower skin is such as to leave portions 19 of sufficient width as will provide a lower flange for each I-beam member such as 20. Following removal of the large block 18 of material, the side portions 21 may be dug out as demonstrated in the right hand side in FIG. 3 or they may be left in place if desired.

Turning now to FIGS. 4 and 5, an alternate form of mandrel 30 is shown consisting of a central trapezoidal section 31 and two side portions 32 of a cross-sectional dimension sufficient to meet with the trapezoidal central portion 31 to provide a substantially rectangular cross-section. The mandrel 30 may be constructed of either wood or metal as desired or any material which will not readily adhere to the resin in the glass cloth surrounding each mandrel. The lower half of the central portion 31 of the modified mandrel is raised upwardly from the lower level as shown at 33 and a bottom plate of the mold 34 is provided with an upraised embossment 35 having sharp shearing edges. In the molding process, after the materials have been wrapped as previously described and assembled in adjacent relationships, the mold is closed and the bottom mold plate 34 is pressed upwardly whereupon the bottom skin 36 adjacent the upraised area 33 will be sheared by the embossment 35. After the resin has cured, the central core section 31 can be easily removed together with portion 36 of the fiber glass sheet and the side portions 32 can be easily extracted from the core as shown in FIG. 5.

As previously stated, the finished structure is integrally formed of the single material and therefore no problems exist with respect to attempting to bond different types of material together. The structure is of minimum weight and optimum strength. The resin of which the structure is manufactured is highly resistant to corrosion, fire and has high impact strength. In addition, the I-beam sections 20 provide substantial rigidity to the structure making it particularly useful as a flooring material although it is equally feasible that this structure might find widespread uses in other fields.

While particular embodiments of the present invention have been shown and described, it will be obvious to persons skilled in the art that changes and modifications may be made without departing from the invention in its broader aspects, and it is the aim of the appended claims to cover all such changes and modifications as fall within the true scope and spirit of this invention.

I claim:
1. A process for making laminated fiber glass panels, the steps comprising individually wrapping a plurality of longitudinal mandrels with resin impregnated glass cloth, positioning said wrapped mandrels in side by side relationship to form a planar assembly, covering said wrapped mandrels with a top sheet comprising an overlay of a number of plies of glass cloth impregnated with resin, curing said resin material under heat and pressure, cutting away sections of the cured glass cloth on the side opposite said top sheet and removing the mandrels from the cores formed thereby.

2. The process described in claim 1, the step of wrapping said mandrels with glass cloth further including overlapping an end of each piece of cloth over the next adjacent wrapped mandrel.

3. The process described in claim 2 further including the step of interposing bundles of glass roving between said top sheet and said wrapped mandrels, and positioning said roving near the junction between adjacent mandrels to provide fillet material.

4. A resin-cured laminated fiber glass panel comprising a continuous top sheet of glass fibers and resin, a plurality of I-beam members extending longitudinally along one side of said top sheet, said I-beam members being integral with said top sheet.

5. A resin-cured laminated fiber glass panel comprising a continuous, fiber glass and resin top sheet, a plurality of spaced longitudinal fiber glass members depending from said top sheet, said depending members having flanges thereon; said top sheet, said depending members and said flanges being integral.

6. A resin-cured laminated glass fiber panel comprising:
a continuous top sheet forming an overlay comprised of a number of plies of glass cloth impregnated with resin,
a plurality of additional sheets of glass fiber impregnated with resin, portions of said additional sheets having the fibers thereof oriented parallel to said top sheet,
a plurality of I-beam members extending longitudinally along one side of said top sheet, said I-beam members being composed of portions of said additional sheets some of the fibers of which extend continuously along the top sheet and through the I-beam members,
all of said glass fiber sheets being integral.

7. A resin-cured laminated glass fiber panel comprising:
a continuous top sheet composed of a plurality of plies of glass cloth impregnated with resin,
a plurality of additional sheets of glass cloth impregnated with resin, portions of the fibers of said additional sheets oriented parallel and adjacent to said top sheet,
a plurality of spaced longitudinal members depending from said top sheet, said depending members having flanges thereon, said depending members and said flanges being composed of portions of said additional sheets some of the fibers of which extend continuously along the top sheet, the depending member and the flange,
said top sheet, said depending members and said flanges being integral.

References Cited
UNITED STATES PATENTS 3,449,482   6/1969   Mitchell et al. _____ 52—309X
3,338,014   8/1967   Waite _____ 52—309
3,435,582   4/1969   Disney et al. _____ 161—37X JOHN T. GOOLKASIAN, Primary Examiner J. C. GIL, Assistant Examiner U.S. Cl. X.R.

52—309; 156—189, 193, 250; 161—69, 99; 264—313, 317